United States Patent
Cook

[11] Patent Number: 6,122,986
[45] Date of Patent: Sep. 26, 2000

[54] SHIFTER ASSEMBLY

[75] Inventor: James Michael Cook, Dearborn, Mich.

[73] Assignee: Ford Global Technologies, Inc., Dearborn, Mich.

[21] Appl. No.: 09/089,723

[22] Filed: Jun. 3, 1998

[51] Int. Cl.[7] ............................ F16H 59/10; B60K 20/00; B60K 17/354

[52] U.S. Cl. ........................ 74/473.28; 74/491; 74/533; 180/247

[58] Field of Search .................. 74/473.28, 491, 74/523, 533; 180/247

[56] References Cited

U.S. PATENT DOCUMENTS

| | | |
|---|---|---|
| 1,304,783 | 5/1919 | Lederer ..................................... 74/533 |
| 3,978,937 | 9/1976 | Chichester et al. .................... 180/44 F |
| 4,077,276 | 3/1978 | Knox, Jr. . |
| 4,086,822 | 5/1978 | Kuroda . |
| 4,126,054 | 11/1978 | Langford et al. . |
| 4,191,064 | 3/1980 | Houk et al. . |
| 4,290,318 | 9/1981 | Ookubo et al. . |
| 4,324,149 | 4/1982 | Johansson et al. . |
| 4,355,543 | 10/1982 | Ikemoto et al. . |
| 4,356,879 | 11/1982 | Uchiyama . |
| 4,365,522 | 12/1982 | Kubota et al. . |
| 4,508,190 | 4/1985 | Uchiyama . |
| 4,612,820 | 9/1986 | Behrens . |
| 4,651,848 | 3/1987 | Kobayashi et al. . |
| 4,989,473 | 2/1991 | McMorris . |
| 5,158,259 | 10/1992 | Fujisawa . |
| 5,398,565 | 3/1995 | Brock . |
| 5,490,434 | 2/1996 | Osborn et al. . |

FOREIGN PATENT DOCUMENTS

| | | |
|---|---|---|
| 0 472 828 A2 | 6/1991 | European Pat. Off. . |
| 268 074 A1 | 5/1989 | Germany . |

Primary Examiner—Allan D. Herrmann
Attorney, Agent, or Firm—Frank G. McKenzie

[57] ABSTRACT

A shift lever assembly is provided including a cylindrical member having a fixed axis. An annular member is supported for rotation about the axis of the cylindrical member. A lever is connected to the annular member and is moveable within a first shift lane and a second shift lane substantially parallel the first shift lane. The second lane is connected to the first lane by a bisecting lane. A compliant member is provided to move the lever from the first lane to the second lane. The compliant member is provided between the cylindrical member and annular member.

14 Claims, 2 Drawing Sheets

6,122,986

SHIFTER ASSEMBLY

FIELD OF THE INVENTION

The present invention relates to a shifter assembly for a motor vehicle having a lateral shift plane and a longitudinal shift plane, and more particularly to such a shift mechanism for a manual transfer case in a four-wheel drive motor vehicle.

DESCRIPTION OF THE PRIOR ART

Manual transfer cases include a shift pattern that typically includes a longitudinal plane and a lateral plane to prevent accidental shifting into an undesired drive range (such as into 4 wheel low). Various devices have been devised to provide a lever which enables these movements in the longitudinal and lateral planes. These devices are complicated and comprised of several pieces including a pair of linkages and a resilient connection for returning the lever to a centered position. An example of such a device is illustrated in U.S. Pat. No. 5,398,565, to Broek ('565 patent). As illustrated in FIG. 6 of the '565 patent, the shift lever moves longitudinally by rotating about a bolt 68. The lever rotates about a shoulder pivot pin 68. A spring 110 is compressed within a pocket 106 to bias a plunger 108 against a protrusion 76 to bias the lever set assembly counterclockwise about the pivot pin 100 relative to the actuator 26 as shown in FIG. 2. This and other prior art shift lever assemblies were constructed from several parts which increases the price of the assembly, increases the likelihood of failure of one of the parts, and due to the stack-up of the tolerances of the parts, creates a potential for the system to not operate as desired. Furthermore, the biasing means comprises a spring which typically varies considerably in manufacture and often results in undesired shifting efforts.

It would therefore be desirable to provide a shift lever assembly made from fewer pieces and having a reliable biasing means.

SUMMARY OF THE INVENTION

It is thus an object of the present invention to provide a shift lever assembly made from fewer pieces and having a reliable biasing means.

Accordingly, a shift lever assembly according to the present invention includes a cylindrical member having a fixed axis. An annular member is supported for rotation about the axis of the cylindrical member. A lever is connected to the annular member and is moveable within a first shift lane and a second shift lane substantially parallel the first shift lane. The second lane is connected to the first lane by a bisecting lane. A compliant member is provided to move the lever from the first lane to the second lane. The compliant member is provided between the cylindrical member and annular member.

DESCRIPTION OF THE PREFERRED EMBODIMENTS

Figure 1:
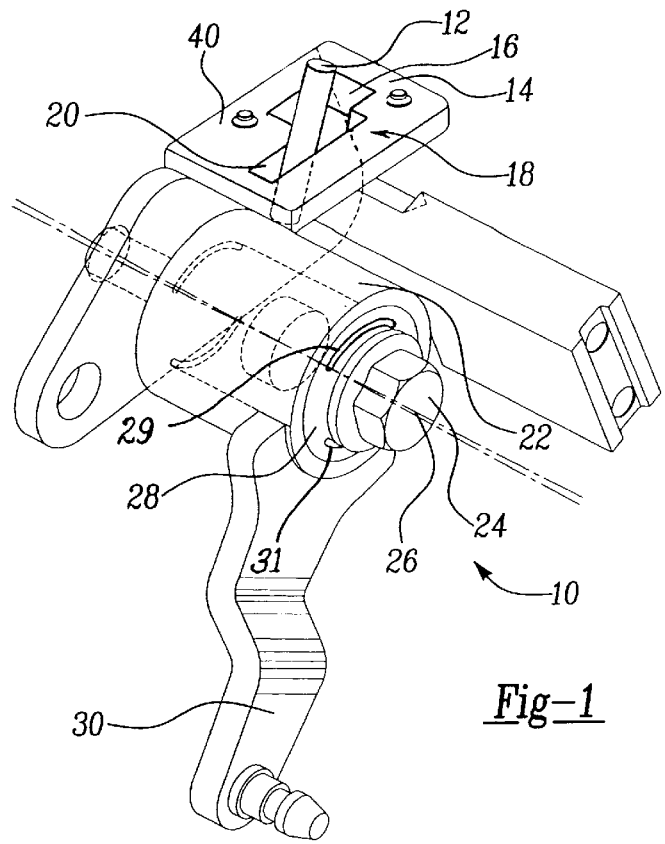
FIG. 1 is an isometric view of a transfer case shifter according to the present invention.

Referring first to FIG. 1, a shifter assembly 10 includes a shift lever 12 for traveling in a shift gate 14. The shift gate 14 includes a first longitudinal lane 16 traversed by a lateral lane 18 connected to a second longitudinal lane 20. The shift gate 14 includes several positions, including a two-wheel drive position, a four-wheel drive high position, and a four-wheel drive low position. A neutral position may also be established within the shift gate 14. The lateral lane 18 prevents unintentional shifting from the first longitudinal lane 16 to the second longitudinal lane 20 when shifting the lever fore/aft, thereby preventing unintentional shifting into an undesired range, which might otherwise occur during an such a shift.

Figure 2:
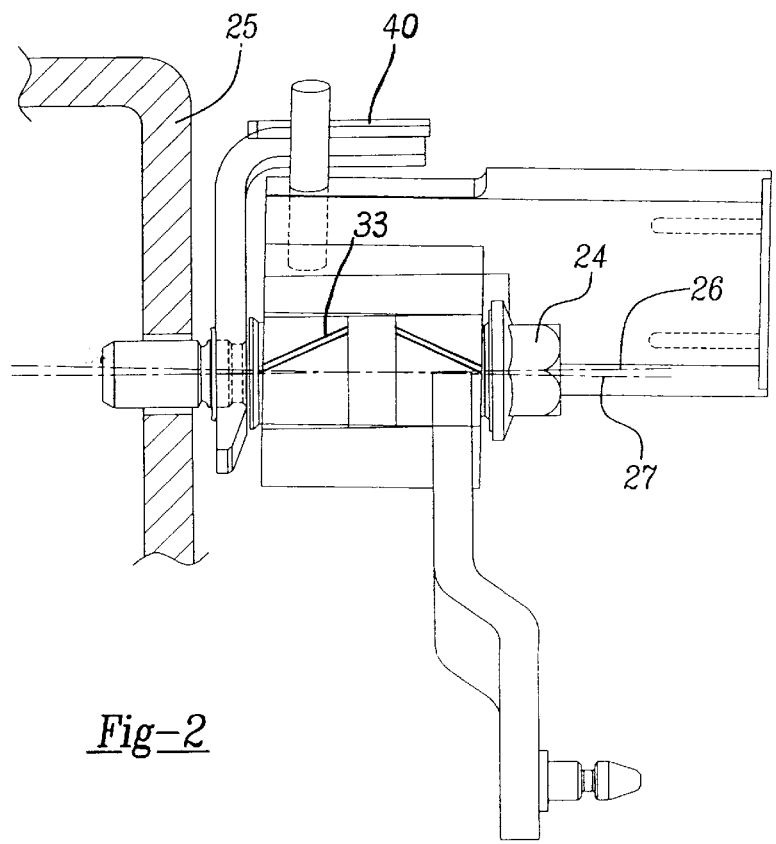
FIG. 2 is a partial front view of the shifter assembly shown in FIG. 1.

The shift lever 12 is connected to a cylindrical or annular member or sleeve 22 supported for rotation about a shoulder bolt 24 having an axis 26. The bolt 24 is preferably fixed to the transfer case 25. Thus, as the lever 12 is moved longitudinally in the first lane 16 or the second lane 20, the cylindrical member 22 rotates about the axis 26 of the bolt 24. A bushing 28 is provided between the cylindrical member 22 and bolt 24. The bushing 28 is preferably made from a rubber or nylon material. This bushing 28 isolates the members from relative movement and thereby prevents noise from vehicle vibrations. More significantly, the bushing 28 has a compliance which enables the cylindrical member 22 to rotate out of alignment with the axis 26, as best viewed in FIG. 2, to a second axis 27. During this movement, the shift lever 12 is moved in the lateral lane 18. The cylindrical member then lies in a second axis 27 intersecting the first axis 26.

Figure 3:
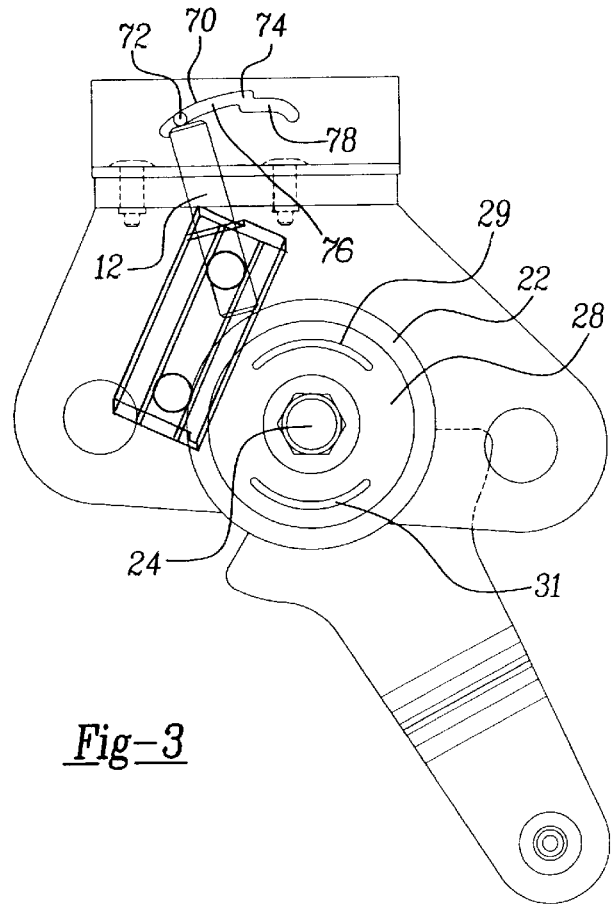
FIG. 3 is a partial side view of the shifter assembly shown in FIG. 1.

During this movement, the bushing 28 is compressed so that the cylindrical member 22 is no longer coaxial with bolt 26. The lever 12 is then permitted to move longitudinally in the shift gate 14 as the cylindrical member 22 rotates about the bolt 24 and thereby move in the second longitudinal lane 20. As best viewed in FIG. 3, the bushing 28 preferably includes a pair of arcuate slots 29, 31 which extend through the bushing 28 along the axis 27 thereof. The arcuate slots 29, 31 are preferably provided above and below the axis 27 as illustrated in FIG. 3, to enable compression of the bushing 28 in the lateral lane and aid in tuning the shift effort to a comfortable level. As best viewed in FIG. 4, the bushing 28 preferably includes a helical slit 33 to facilitate assembly over the shoulder bolt 24.

The shifter assembly 10 further includes a link 30 attached to the cylindrical member 22. This link 30 is connected in a known manner to a cable or rod (not shown) attached to the transfer case to enable manual shifting thereof in a known manner.

Figure 4:
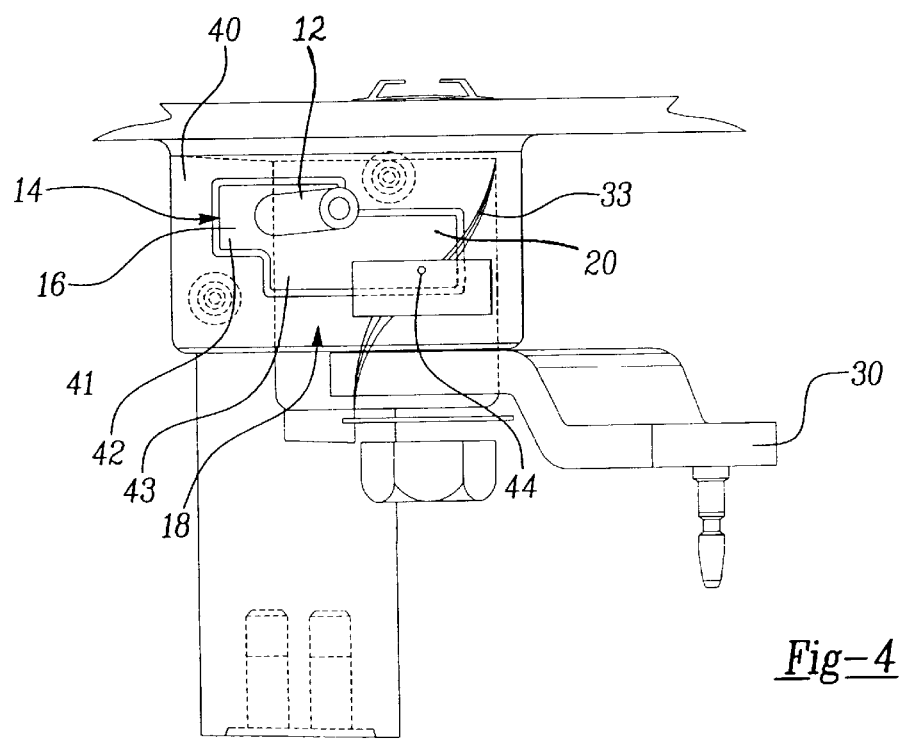
FIG. 4 is a plan view of the shifter assembly shown in FIG. 1.

As shown in FIG. 4, the shift gate 14 is formed in a plate 40 which is preferably fixed to the transfer case (not shown). The shift gate 14 includes a two-wheel drive position 41, a four-wheel high position 42, a neutral position 43, and a four wheel drive low position 44. As described above, movement in the lateral lane 18 is resisted by the compliance of the bushing 28. In a manner known to one skilled in the art, when the lever 12 is moved to the neutral position 43, the transfer case driveably disconnects the engine from the drive wheels. In a preferred embodiment, this is done by driveably disengaging a planetary gearset in a manner known to one skilled in the art. As the lever 12 is moved to the four-wheel low position 44, the planetary gearset is shifted into a low range.

In an alternative embodiment, as illustrated in FIG. 3, a pin 72 projects from the shift lever 12, parallel the axis 26, and a cam is provided in which the pin follows as the cylindrical member 22 is rotated about the bolt 24. Instead of the lateral lane 18, the alternative embodiment includes a detent 74 in the cam 70. The pin 72, as it rotates to the detent 74, enables the lever 12 to be moved from a two-wheel drive to a four-wheel drive high mode. The lever 12 is depressed into a second lane 78 of the cam 70 to disengage the transfer case and thus achieve a neutral position. As the pin 72 is moved forward in the lower portion of the cam 78, a four-wheel low mode is engaged. The bushing 28 allows the cylindrical member 22 to be depressed perpendicular to the axis of the bolt 24.

One skilled in the art recognizes that the bushing 28 may be constructed to bias the lever 12 either to the first longitudinal shift lane 16, the second longitudinal shift lane 20, or a position in the lateral shift lane 18 intermediate the two longitudinal shift lanes 16, 20.

In a further alternative embodiment, the present invention may be applied to a manual transmission shifter. The shift lever 12 would travel in a shift gate 14 having an H-shape pattern as is known to one skilled in the art. Preferably, the lateral movement is performed against the compliance of the bushing and the fore/aft movement of the lever is performed rotationally against the bolt in a manner similar to that described above for the transfer case shifter.

In a further alternative embodiment, the bolt 24 rotates about the axis 26 and the bushing 28 and cylindrical member 22 rotate therewith.

The forms of the invention shown and described herein constitute the preferred embodiments of the invention; they are not intended to illustrate all possible forms thereof. The words used are words of description rather than of limitation, and various changes may be made from that which is described here without departing from the spirit and scope of the invention.

What is claimed is:

1. A shift lever assembly comprising:
   a shoulder bolt having a fixed axis and an outer surface;
   a cylindrical member supported for rotation about the axis of the shoulder bolt and having an inner surface;
   a lever connected to the cylindrical member, the lever moveable in a first shift lane and a second shift lane substantially parallel the first shift lane, the second lane connected to the first lane by a bisecting lane;
   a compliant means for moving the lever from the first lane to the second lane, the compliant means provided between the cylindrical member and shoulder bolt; and
   wherein the compliant means comprises an annular bushing interposed between the outer and inner surfaces.

2. A shift lever assembly according to claim 1, wherein the bushing is made from a nylon material.

3. A shift lever assembly according to claim 2, wherein the bushing further comprises a longitudinal arcuate slot.

4. A shift lever assembly according to claim 3, wherein the arcuate slot is substantially parallel the fixed axis.

5. A shift lever assembly according to claim 4, wherein the shoulder bolt is secured to a transfer case.

6. A shift device for a four wheel drive motor vehicle having a shift lever for shifting a manual transfer case, the shift device comprising:
   a shoulder bolt attached to the transfer case;
   an annular sleeve supported for rotation about the axis of the shoulder bolt;
   a lever connected to the annular sleeve, the lever moveable in a first shift lane and a second shift lane substantially parallel the first shift lane, the second lane connected to the first lane by a bisecting lane;
   a compressible annular bushing provided between the shoulder bolt and annular sleeve, the bushing compressible to an extent to permit the lever to travel across the bisecting lane.

7. A shift device according to claim 6, wherein the bushing comprises a longitudinal arcuate slot in the bushing.

8. A shift device according to claim 7, wherein the bushing comprises a nylon material.

9. A shift device according to claim 7, wherein the bushing comprises a rubber material.

10. A shift device according to claim 7, wherein the bushing further comprises a helical split.

11. A method of providing a shift pattern for a shift lever supported for rotation by an annular member about a fixed axis, comprising:
    providing a shift gate having first longitudinal lane, a second longitudinal lane substantially parallel the first lane and a third lane bisecting the first and second lanes to direct the travel of the shift lever in a predetermined manner;
    supporting the annular member for rotation about the fixed axis; and
    providing an annular compliant bushing between the fixed axis and the annular member, the compliant bushing permitting travel of the lever across the third lane.

12. A method of providing a shift pattern according to claim 11, wherein the annular compliant bushing opposes movement of the lever within the bisecting lane to the second lane.

13. A method of providing a shift pattern according to claim 12, wherein the annular compliant bushing urges the lever within the bisecting lane to the first lane.

14. A method of providing a shift pattern according to claim 13, further comprising the step of providing a longitudinal arcuate slot in the annular bushing.

* * * * *